United States Patent [19]
Clanton

[11] Patent Number: 5,661,976
[45] Date of Patent: Sep. 2, 1997

[54] GASKETLESS COUPLING

[76] Inventor: Robert W. Clanton, 5983 Maysville Rd., New Market, Ala. 35761

[21] Appl. No.: 529,337

[22] Filed: Sep. 18, 1995

[51] Int. Cl.[6] .................................................... F01N 7/18
[52] U.S. Cl. ................................................ 60/322; 285/261
[58] Field of Search ................................. 60/322; 285/261

[56] References Cited

U.S. PATENT DOCUMENTS

| | | | |
|---|---|---|---|
| 1,167,355 | 1/1916 | Everson | 285/261 |
| 3,002,269 | 10/1961 | Hopkins | 285/261 |
| 4,182,121 | 1/1980 | Hall | 60/322 |
| 4,465,308 | 8/1984 | Martini | 285/261 |
| 5,415,439 | 5/1995 | Wells | 285/261 |

FOREIGN PATENT DOCUMENTS

| | | | |
|---|---|---|---|
| 2627375 | 12/1977 | Germany | 285/261 |
| 10086 | of 1887 | United Kingdom | 285/261 |

*Primary Examiner*—Douglas Hart
*Attorney, Agent, or Firm*—John C. Garvin, Jr.; Harold W. Hilton

[57] ABSTRACT

A gasketless connector for connecting a first tubular member having a flared end portion to a second tubular member. The connector member is provided with a substantially domical body portion having inner and outer surfaces and first and second side portions, a first tubular portion extending in a first direction from the first side of the domical portion and a second tubular portion extending in a second direction from the second side of the substantially domical portion. The first tubular portion is disposed for extending into the first tubular member for abutting relation of the flared surface of the first tubular member with the outer surface of the first side of the domical portion. The second tubular portion is disposed for secured relation with the second tubular member.

3 Claims, 1 Drawing Sheet

GASKETLESS COUPLING

BACKGROUND OF THE INVENTION

Engine exhaust systems for internal combustion engines typically include sealed connections between tubular components to prevent exhaust gases from leaking. Typically these sealed connections require the use of gaskets or other sealing means between the joined components. However, as a result of the very hot gases flowing through the system, the sealing means, including gaskets, etc. become brittle and useless as a seal.

In one such exhaust system an exhaust collector header is provided with a flared or flanged end which is in abutting relation with one side of a thin gasket. The flared or flanged end of an exhaust pipe is disposed in abutting relation with the opposite side of the gasket thereby sandwiching the gasket between the flanged portions of the header collector and exhaust pipe. Two connector members are disposed for bolted relation to secure the gasket between the end flanged portions of the header collector. In such an arrangement the inner peripheral surface of the gasket is in direct contact with the hot exhaust gases and is subjected to erosion, brittleness, cracking, etc. as a result of the contact with the hot exhaust gases. In addition, the metal components adjacent the gaskets become very hot and the heat transfer from the metal exhaust collector header and the adjacent exhaust pipe, to the gasket further aids in the degradation of the gasket.

The device of the present invention relies on metal-to-metal contact between the mating ends of the exhaust collector header and the exhaust pipe. No gasket is required, thus eliminating costly gasket repair jobs. Additionally, assembly of the parts can be accomplished in a rapid and facile manner.

It is, therefore, an object of the present invention to provide a gasketless connector for sealing the joint between two joined members.

It is a further object of the present invention to provide such a connector with means which will prevent misalignment and "cocking" of the joined members during and after assembly.

It is still another object of the present invention to provide such a gasketless connector for joining sections of exhaust systems of internal combustion engines.

These and other objects of the present invention will become more readily apparent from the accompanying drawings and description.

DESCRIPTION OF THE PREFERRED EMBODIMENT

Figure 1:
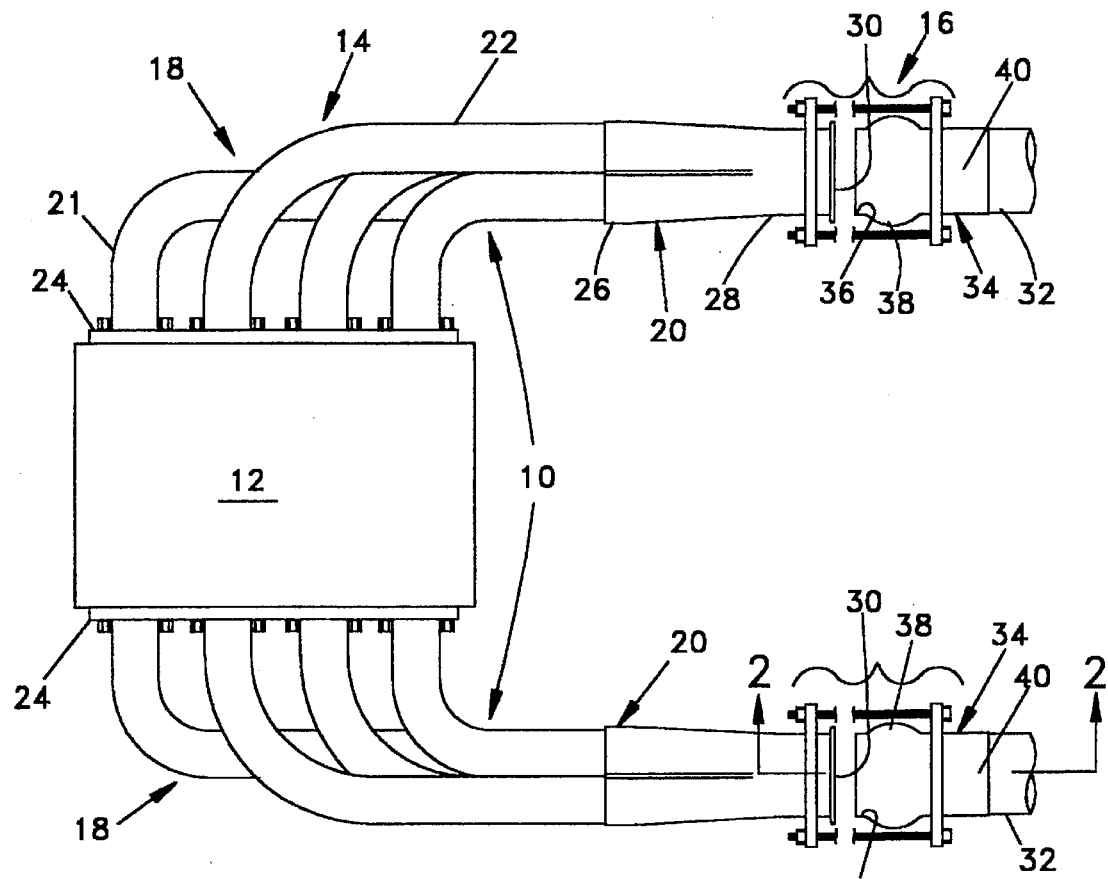
FIG. 1 is a top view of an engine using the joint of the invention.

In FIG. 1 a vehicle exhaust system 10 is shown connected to an internal combustion engine 12. The exhaust system is shown to include two connected sections 14 and 16. Section 14 includes a plurality of primary exhaust tubes 18 and a header collector 20. Tubes 18 are provided with ends 21 and 22. Ends 21 are secured to a support plate 24 (as by welding or other convenient means) and ends 22 extend in secured relation into an end portion 26 of header collector 20. Header collector 20 is shown to be provided with a second end portion 28 having an end 30 provided with a flared inner surface.

Section 16 of the exhaust system 10 includes an exhaust pipe 32 which is disposed for attachment to a muffler (not shown).

A connector member 34 is disposed for connecting sections 14 and 16 together to form a joint therebetween. The joint does not utilize a gasket but relies solely on metal-to-metal contact between the mating surfaces forming the joint.

Connector member 34 includes an extending annular portion 36 extending away from a first side of an intermediate substantially spherical portion 38 and an annular end portion 40 which axially extends from a second side of intermediate portion 38 in the direction opposite from portion 36. Exhaust pipe 32 is secured to end portion 40 as by welding, etc.

A first clamping member 42 (FIGS. 2 and 3) is provided with a plurality of bolt receiving holes 44 (preferably three) and is mounted about end portion 28 of header 20. Clamping member 44 includes an interior surface 46 (FIG. 3) which is disposed for engagement with an exterior surface 47 (FIG. 3) of the flared end 30 of the header 20. Surface 47 may be formed to conform to the curvature of flared portion 30, if desired. A second clamping member 48 is disposed about the end portion 40 and is provided with a plurality of matching bolt receiving holes 50 and includes an interior surface 52 which is disposed for engagement with an exterior surface 54 of the substantially spherical portion 38 of connector member 24. The interior surface 52 of clamping member 48 may be formed to match the curvature of the exterior substantially spherical surface of member portion 38, if desired, as seen more clearly in FIG. 2.

To assemble the two sections, the extending portion 36 of member 34 is inserted into the flared end portion 30 of header 20. Portion 36 of member 34 substantially snugly fits into the flared end portion 30 of header 20 and serves as an alignment and guide member, supports the connector in the header and prevents "cocking" of the parts during and after assembly. As more clearly seen in FIG. 3, metal-to-metal contact occurs between the inner flanged surface of end 30 of the collector and the outer surface of the intermediate spherical portion 38 of member 34 at a point or area which is adjacent the juncture of intermediate spherical portion 38 and the extending portion 36 of member 34.

Figure 2:
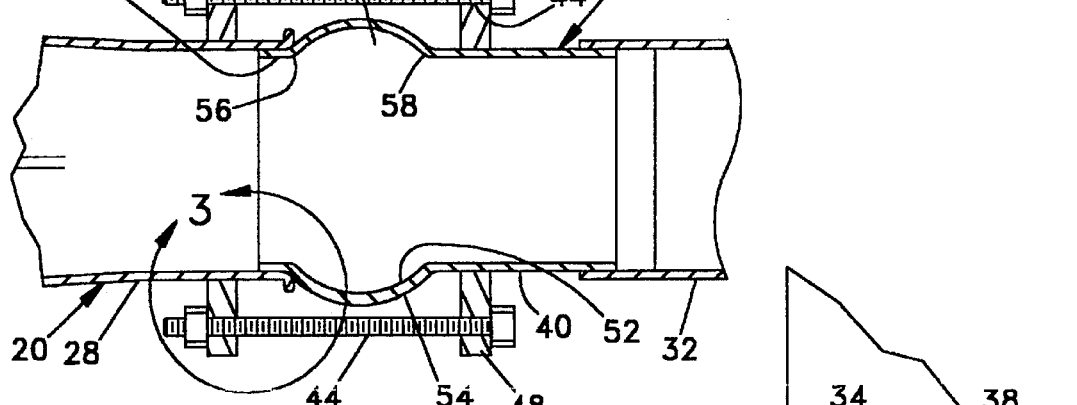
FIG. 2 is a cross-sectional view of the joint of the invention.
Figure 3:
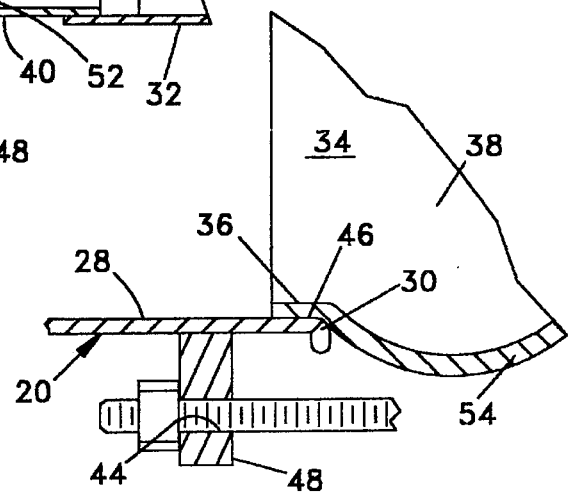
FIG. 3 is a detailed section of a part of the joint of the invention indicated by the numeral 3 in FIG. 2.

As seen in FIG. 2, the interior curved surfaces of connector member 34 as indicated at 56 and 58 present smooth, curved surfaces in the path of gas flow so as not to obstruct gas flow or invite turbulence to gas flow through the exhaust system.

While the foregoing has been directed to a specific embodiment of the present invention it is to be understood that various modification may be resorted to that is within the spirit and scope of the following claims.

I claim:

1. An internal combustion engine gas exhaust system comprising:
    a first section including a plurality of primary exhaust pipes disposed for secured relation with and extending away from said internal combustion engine, and an exhaust header collector having first and second ends, said first end disposed for secured relation with the distal end of said primary exhaust pipes and said second end being flared to provide an annular flange thereon, said annular flange having an inner flared surface;

a second section including an exhaust pipe disposed for attachment to said first section; and a gasketless connector member disposed for attaching said first and second sections together, said connector member including a body having an enlarged hollow spherical portion provided with inner and outer surfaces, said connector member disposed for attaching said first and second sections together, said connector member including a body having an enlarged spherical portion provided with inner and outer surfaces, and first and second opposite side portions, a first tubular portion defining a guide and alignment member extending in a first direction from said first side portion of said spherical portion and disposed for insertion into said flared end of said header collector for abutting metal-to-metal contact between said outer surface of said spherical portion of said connector member and said flared surface of said header to prevent "cocking" of said first section relative to said second section, said connector member having a second tubular portion extending from said second opposite side portion in a second direction which is opposite from said first direction for secured relation with said exhaust pipe, said first and second tubular portions being of smaller diameter than said spherical portion; and means for securing said connector member and said header collector together in said metal-to-metal contact.

2. The exhaust system of claim 1 wherein said means for securing said connector member and said header collector together comprises a first flange positioned around said second end of said header collector, said first flange disposed for abutting relation with said annular flange of said header collector and a second flange positioned around said second tubular portion of said domical portion for abutting relation with said domical portion, and, bolt means for bolting said first and second flange together for secured relation of said connector member and said header collector.

3. The exhaust system of claim 1 wherein said metal-to-metal contact occurs between said inner flanged surface of said header collector and said outer surface of said spherical portion at a point on said outer surface of said spherical portion which is adjacent the juncture of said spherical portion and said guide and alignment member.

* * * * *